United States Patent
Koseki et al.

(10) Patent No.: US 11,348,738 B2
(45) Date of Patent: May 31, 2022

(54) ELECTROLYTIC CAPACITOR AND METHOD FOR MANUFACTURING SAME

(71) Applicant: NIPPON CHEMI-CON CORPORATION, Tokyo (JP)

(72) Inventors: Kazuya Koseki, Tokyo (JP); Kazuhiro Nagahara, Tokyo (JP); Kenji Machida, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 253 days.

(21) Appl. No.: 16/650,565

(22) PCT Filed: Oct. 2, 2018

(86) PCT No.: PCT/JP2018/036871
§ 371 (c)(1),
(2) Date: Mar. 25, 2020

(87) PCT Pub. No.: WO2019/069917
PCT Pub. Date: Apr. 11, 2019

(65) Prior Publication Data
US 2021/0202184 A1    Jul. 1, 2021

(30) Foreign Application Priority Data
Oct. 4, 2017 (JP) .............................. JP2017-194677

(51) Int. Cl.
*H01G 9/022* (2006.01)
*H01G 9/00* (2006.01)
(Continued)

(52) U.S. Cl.
CPC ........... *H01G 9/022* (2013.01); *H01G 9/0029* (2013.01); *H01G 9/0425* (2013.01); *H01G 9/035* (2013.01)

(58) Field of Classification Search
CPC .............................. H01G 9/022; H01G 9/0425
See application file for complete search history.

(56) References Cited

U.S. PATENT DOCUMENTS

| 6,519,137 | B1 * | 2/2003 | Nitta ...................... | H01G 9/025 |
| | | | | 361/525 |
| 2003/0076648 | A1 * | 4/2003 | Honda ................... | H01G 9/025 |
| | | | | 361/504 |
| 2012/0229955 | A1 * | 9/2012 | Biler ...................... | H01G 9/028 |
| | | | | 361/529 |

FOREIGN PATENT DOCUMENTS

| JP | 3-112116 A | 5/1991 |
| JP | 3-37293 B2 | 6/1991 |
| | (Continued) | |

OTHER PUBLICATIONS

International Search Report, issued in PCT/JP2018/036871, dated Dec. 18, 2018.
(Continued)

*Primary Examiner* — Eric W Thomas
(74) *Attorney, Agent, or Firm* — Birch, Stewart, Kolasch & Birch, LLP

(57) ABSTRACT

Provided is an electrolytic capacitor that can reliably exhibit redox capacity due to a conductive polymer layer of a cathode. The electrolytic capacitor includes: a cathode having a conductive substrate and a conductive polymer layer placed on the surface of the conductive substrate; an anode having a substrate composed of a valve metal and a dielectric layer composed of an oxide of the valve metal that is placed on the surface of the substrate, the anode being disposed such that the dielectric layer and the conductive polymer layer of the cathode are opposed to each other across a space; and an ion conductive electrolyte with which the space is filled, the conductive polymer layer of the cathode that is in contact with the ion conductive electrolyte (Continued)

exhibiting a redox capacity due to application of a voltage between the anode and the cathode, wherein the contact resistance between the conductive substrate and the conductive polymer layer in the cathode is 1 $\Omega\text{cm}^2$ or less.

20 Claims, 1 Drawing Sheet

(51) Int. Cl.
*H01G 9/042* (2006.01)
*H01G 9/035* (2006.01)

(56) References Cited

FOREIGN PATENT DOCUMENTS

| JP | 7-283086 A | 10/1995 |
|---|---|---|
| JP | 2000-269070 A | 9/2000 |
| JP | 2006-352172 A | 12/2006 |

OTHER PUBLICATIONS

Written Opinion of the International Searching Authority, issued in PCT/JP2018/036871, dated Dec. 18, 2018.

* cited by examiner

ELECTROLYTIC CAPACITOR AND METHOD FOR MANUFACTURING SAME

TECHNICAL FIELD

The present invention relates to an electrolytic capacitor having a cathode exhibiting a high capacity, and a method of manufacturing the same.

THE RELATED ART

An electrolytic capacitor having an ion conductive electrolyte (including an electrolytic liquid) generally has a structure in which an anode having an oxide film as a dielectric layer that is placed on the surface of a foil composed of a valve metal such as aluminum, tantalum and niobium, a cathode for current collection that is composed of a valve metal foil or the like (an apparent cathode), and a separator that is arranged between the anode and the cathode and holds the ion conductive electrolyte as a true cathode are housed in a sealed case, and the electrolytic capacitors having a wound type, a laminated type or the like are widely used.

This electrolytic capacitor has an advantage that it is smaller and has a larger capacity than a plastic capacitor or a mica capacitor, and the dielectric breakdown voltage of the capacitor can be improved by thickening the oxide film of the anode. However, if the oxide film of the anode is made thick, the capacity of the electrolytic capacitor is lowered, and part of the advantage of its small size with a large capacity is lost. In order to improve the capacity of the electrolytic capacitor without lowering the dielectric breakdown voltage, studies have been conducted to increase the capacity of the cathode.

For example, by controlling the conditions for applying chemical or electrochemical etching treatment to the valve metal foils constituting the anode and the cathode, studies have been under way to effectively increase the surface area of these valve metal foils, thereby increasing the capacity of the anode as well as the cathode. Patent Document 1 (JP H3-37293 B) also discloses a cathode material in which the surface of a moderately roughened aluminum foil is coated with a titanium vapor deposition film with a thickness of 0.2 to 5.0 µm that is made of titanium fine particles having an average particle size of 0.02 to 1.0 µm and formed in an inert atmosphere such as argon or helium, as a cathode material to solve a problem that, in an aluminum electrolytic capacitor, dissolution of the surface of the aluminum foil into an etching solution simultaneously progresses when etching becomes excessive, thereby preventing increase in the surface area of the foil and limiting increase in the capacity of the cathode by etching. With this cathode material, the surface of the titanium vapor deposition film is finely roughened, so the surface area of the cathode material is increased, and consequently, the capacity of the aluminum electrolytic capacitor is increased. In addition, a cathode material having excellent durability is obtained by the titanium vapor deposition film.

Patent Document 2 (JP H3-112116 A) raises a problem that, in a life test at a high temperature in particular, a titanium vapor deposition film that is placed on the surface of an aluminum foil is reacted with an electrolytic solution for driving and an oxide layer is formed on the surface, so the capacity of an electrolytic capacitor is significantly reduced, and proposes an electrolytic capacitor having a capacitor element in which an anode having an extraction terminal attached to an anode foil that is made of a valve-acting metal, a cathode in which a polypyrrole is formed on the surface of a cathode foil that is made of a valve-acting metal by chemical oxidative polymerization and an extraction terminal is attached to the cathode foil, and a spacer interposed between the anode and the cathode are wound, an electrolytic solution for driving impregnated in the capacitor element, and a sealed case in which the impregnated capacitor element is housed, as an electrolytic capacitor that can increase the capacity per unit volume and features a long life and high reliability. It explains that the polypyrrole layer provided on the surface of the cathode foil by chemical oxidative polymerization suppresses the formation of an oxide layer on the surface of the valve-acting metal, thereby suppressing a decrease in capacity, and the polypyrrole layer is a layer in which spherical objects are gathered and formed into a film shape, thereby contributing to an increase in surface area, and the capacity of the cathode becomes the capacity of the electric double layer because an insulating film such as an oxide film is not formed on the surface of the polypyrrole layer, thereby showing little change with time. Further, it reports that the electrolytic capacitor with a rated vale of 4 VDC-100 µf in its example, which is obtained by impregnating γ-butyrolactone-phthalic acid-based paste as an electrolytic solution into an element formed by winding, via a spacer, an anode in which an anode oxide film is formed after the surface of an aluminum foil is roughened to enlarge the surface area, and a cathode in which a polypyrrole layer is formed by chemical oxidation polymerization on the surface of a cathode foil which is roughened to enlarge the surface area, exhibits a slightly larger capacity and shows an improved rate of change in capacity in a life test at 105 degrees centigrade, compared with the electrolytic capacitor of a conventional example with a cathode in which a titanium vapor deposition film is formed on the surface of an aluminum foil after the surface of the aluminum foil is roughened to enlarge its surface area, instead of the abovementioned cathode.

Although no attention has been paid to increasing the capacity of the cathode, there is a prior document that discloses an electrolytic capacitor in which a conductive polymer layer different from a polypyrrole layer by chemical oxidative polymerization is disposed in the cathode. Patent Document 3 (JP H7-283086 A) describes an electrolytic capacitor having a cathode foil in which an electropolymerized film of polypyrrole is formed on the surface of an etched aluminum foil as Example 9, but does not describe an increase or decrease in capacity due to the electropolymerized film. Patent Document 4 (JP 2000-269070 A) describes electrolytic capacitors having an electrode foil (cathode) in which a conductive polymer layer is formed by coating a polyethylenedioxythiophene dispersion on the surface of an etched aluminum foil as Examples 16 and 17. The capacity values shown for these examples are not increased compared with those of the electrolytic capacitor of Example 3 in which a conductive layer made of polyethylenedioxythiophene is formed instead of an electrolytic solution (see Table 1 in this document).

Further, in PCT/JP2017/013331, which is not published at the time of filing of the application on which the priority claim of the present application is based, the applicant has proposed an electrolytic capacitor comprising: a cathode comprising a conductive substrate and a conductive polymer layer placed on a surface of the conductive substrate; an anode comprising a substrate composed of a valve metal and a dielectric layer composed of an oxide of the valve metal that is placed on a surface of the substrate and is so placed that the dielectric layer and the conductive polymer layer of the cathode face each other through a space; and an ion conductive electrolyte filled in the space, wherein the conductive polymer layer of the cathode that is in contact with the ion conductive electrolyte expresses a redox capacity when a voltage is applied between the anode and the cathode. The capacity of the cathode is remarkably increased by the redox capacity indicated by the conductive polymer layer, and accordingly, the capacity of the electrolytic capacitor is also remarkably increased.

PRIOR ARTS DOCUMENTS

Patent Documents

Patent Document 1: JP H3-37293 B
Patent Document 2: JP H3-112116 A
Patent Document 3: JP H7-283086 A
Patent Document 4: JP 2000-269070 A

SUMMARY OF THE INVENTION

Problems to be Solved by the Invention

In the electrolytic capacitor shown in the abovementioned PCT/JP2017/013331, since electrons are supplied from the conductive substrate to the conductive polymer layer in the cathode to advance the redox reaction and thereby the redox capacity is developed, the capacity of the cathode is remarkably increased, and therefore the capacity per unit volume of the electrolytic capacitor is remarkably increased. In the electrolytic capacitors disclosed in Patent Documents 2 to 4, the supply of electrons to the conductive polymer layer is presumably insufficient for developing the redox capacity. However, in the PCT/JP2017/013331, the conditions for reliably expressing the redox capacity are not sufficiently examined either. It is therefore an object of the present invention to provide an electrolytic capacitor which can reliably express the redox capacity of the conductive polymer layer of the cathode.

Means for Solving Problems

As a result of intensive investigation based on the technique disclosed in the abovementioned PCT/JP2017/013331, the inventors have discovered that a sufficient amount of electrons is supplied from the conductive substrate to the conductive polymer layer to proceed the redox reaction and the redox capacity can be reliably expressed when a contact resistance between the conductive substrate and the conductive polymer layer in the cathode is 1 $\Omega cm^2$ or less, and thereby completed the invention.

Accordingly, the present invention provides an electrolytic capacitor comprising:

a cathode comprising a conductive substrate and a conductive polymer layer placed on a surface of the conductive substrate;

an anode comprising a substrate composed of a valve metal and a dielectric layer composed of an oxide of the valve metal that is placed on a surface of the substrate and is so placed that the dielectric layer and the conductive polymer layer of the cathode face each other through a space; and an ion conductive electrolyte filled in the space, the conductive polymer layer of the cathode that is in contact with the ion conductive electrolyte expressing a redox capacity when a voltage is applied between the anode and the cathode, wherein a contact resistance between the conductive substrate and the conductive polymer layer in the cathode is 1 $\Omega cm^2$ or less.

The conductive substrate in the cathode can be composed of one conductive layer or a plural different conductive layers. In the case of plural layers, they can be used as the conductive substrate even if an insulating layer exists between the conductive layers, as long as a part of the insulating layer is broken and the conductive layers are electrically connected. The contact resistance between the conductive substrate and the conductive polymer layer in the cathode is a value measured by the method shown in FIG. 1. FIG. 1($a$) is a diagram showing a measurement method in a case where the conductive substrate is composed of one conductive layer, and FIG. 1($b$) is a diagram showing a measurement method in a case where the conductive substrate is composed of two conductive layers. Before measuring the contact resistance, carbon paste (product model: DY-200L-2, manufactured by Toyobo Co., Ltd.) having a thickness of 5 to 10 μm is applied to the surface of the conductive polymer layer and dried at 150 degrees centigrade for 20 minutes, and then a copper foil is fixed to the surface of the carbon layer through silver paste (product model: DW-250H-5, manufactured by Toyobo Co., Ltd.) and dried at 150 degrees centigrade for 20 minutes. Then, in FIG. 1($a$), an AC impedance is measured between the copper foil and the conductive substrate in the frequency range of 0.1 Hz to 100 kHz, and in FIG. 1($b$), the AC impedance is measured between the copper foil and the conductive layer that is not in contact with the conductive polymer layer (the first layer) in the conductive substrate. The value of the real component of the obtained Cole-Cole plot is the contact resistance between the conductive substrate and the conductive polymer layer. For example, when the first layer is an aluminum foil, an aluminum oxide film is generally formed on the surface, but when a conductive layer is formed as the second layer on the surface of the aluminum oxide film, the measuring method shown in FIG. 1($b$) is adopted. When the conductive substrate is composed of three or more conductive layers, the AC impedance measurement is performed between the copper foil connected to the conductive polymer layer via the carbon paste and the silver paste by the aforementioned method and the conductive layer farthest from the conductive polymer layer, and the value of the real component of the obtained Cole-Cole plot is the contact resistance between the conductive substrate and the conductive polymer layer at the cathode. When the conductive substrate is composed of three or more conductive layers, the aforementioned AC impedance measurement is performed between the copper foil connected to the conductive polymer layer via the carbon paste and the silver paste by the aforementioned method and the conductive layer that is farthest from the conductive polymer layer, and the value of the real component of the obtained Cole-Cole plot is the contact resistance between the conductive substrate and the conductive polymer layer in the cathode.

In the electrolytic capacitor of the present invention, the cathode exhibits a remarkably increased capacity, and consequently, the capacity per unit volume of the electrolytic capacitor is remarkably increased, since the conductive polymer layer of the cathode that is in contact with the ion conductive electrolyte reliably exhibits a redox capacity. The conductive polymer layer of the cathode needs to be in direct contact with the ion conductive electrolyte in order to develop the redox capacity, but the dielectric layer of the anode can be in direct contact with the ion conductive electrolyte, or can be indirectly connected with the ion conductive electrolyte via another conductive material.

The contact resistance between the conductive substrate and the conductive polymer layer in the cathode is preferably 0.06 $\Omega cm^2$ or less. When the contact resistance is 0.06 $\Omega cm^2$ or less, a high capacity can be obtained even under conditions of a high frequency, and therefore an electrolytic capacitor exhibiting a high capacity in a wide frequency range can be obtained.

Preferably, the conductive substrate comprises: an aluminum foil provided with an aluminum oxide film; and an inorganic conductive layer provided on the surface of the aluminum oxide film and comprising an inorganic conductive material, and the inorganic conductive layer and the aluminum foil are electrically connected. In this case, the conductive polymer layer is placed on the surface of the inorganic conductive layer. The aluminum oxide film can be a naturally oxidized film or a chemical oxide film formed by chemical conversion treatment. The aluminum foil is preferable because it exhibits good corrosion resistance against an electrolytic solution. Further, in the process of providing the inorganic conductive layer on the surface of the aluminum oxide film, a part of the aluminum oxide film is broken, and the inorganic conductive layer and the aluminum foil are electrically connected to each other, whereby the contact resistance between the conductive substrate and the conductive polymer layer in the cathode can be adjusted to 1 $\Omega cm^2$ or less, preferably 0.06 $\Omega cm^2$ or less, and the redox capacity of the conductive polymer layer at the cathode can be reliably expressed.

The type of inorganic conductive material for forming the abovementioned inorganic conductive layer and the method for forming the inorganic conductive layer are not particularly limited as long as the contact resistance between the conductive substrate and the conductive polymer layer in the cathode can be adjusted to 1 $\Omega cm^2$ or less, preferably 0.06 $\Omega cm^2$ or less, but it is preferable that the inorganic conductive material is at least one material selected from the group consisting of carbon, titanium, titanium nitride, titanium carbide and nickel because a cathode having excellent durability can be obtained.

The present invention also provides a method of manufacturing an electrolytic capacitor of the present invention, comprising:

a cathode forming step of forming a conductive polymer layer on a surface of a conductive substrate so that a contact resistance between the conductive substrate and the conductive polymer layer is 1 $\Omega cm^2$ or less for obtaining a cathode for the electrolytic capacitor;

an anode forming step of oxidizing a surface of a substrate composed of a valve metal to form a dielectric layer composed of an oxide of the valve metal for obtaining an anode for the electrolytic capacitor; and an electrolyte filling step of making the conductive polymer layer of the cathode and the dielectric layer of the anode face each other through a space and filling an ion conductive electrolyte in the space. With this method, an electrolytic capacitor in which the conductive polymer layer of the cathode exhibits a redox capacity with high reliability can be obtained.

Advantageous Effects of the Invention

In the electrolytic capacitor of the present invention wherein the contact resistance between the conductive substrate and the conductive polymer layer in the cathode is 1 $\Omega cm^2$ or less, when a voltage is applied between the anode and the cathode, the conductive polymer layer at the cathode that is in contact with the ion conductive electrolyte exhibits a redox capacity with high reliability, so that the cathode exhibits a remarkably increased capacity, and consequently, the capacity per unit volume of the electrolytic capacitor is remarkably increased.

DETAILED DESCRIPTION OF THE INVENTION

Figure 1:
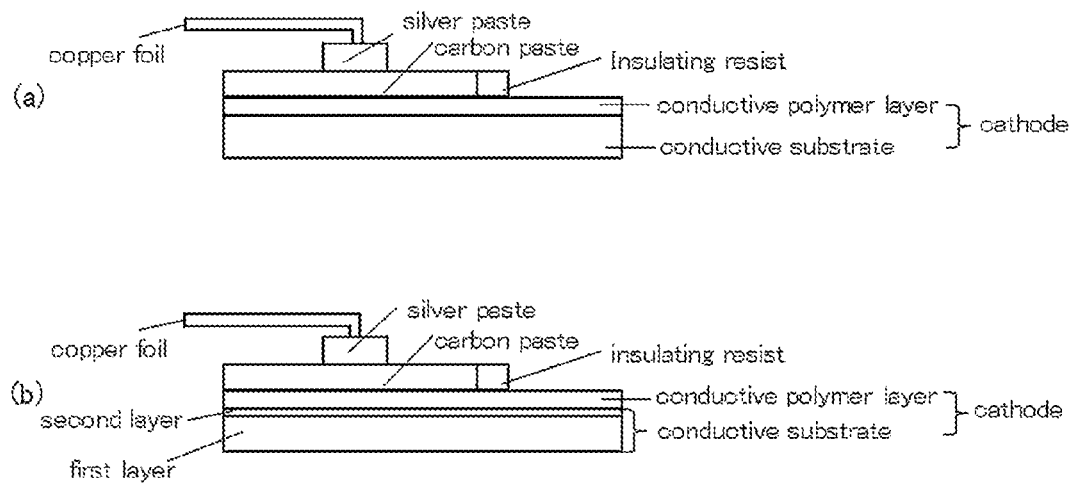
FIG. 1 is a schematic diagram for explaining a method of measuring a contact resistance between a conductive substrate and a conductive polymer layer in a cathode; (a) is a diagram showing a method of measuring when the conductive substrate is composed of one conductive layer, and (b) is a diagram showing a method of measuring when the conductive substrate is composed of two conductive layers.

Disclosed is an electrolytic capacitor comprising: a cathode comprising a conductive substrate and a conductive polymer layer placed on a surface of the conductive substrate; an anode comprising a substrate composed of a valve metal and a dielectric layer composed of an oxide of the valve metal that is placed on a surface of the substrate and is so placed that the dielectric layer and the conductive polymer layer of the cathode face each other through a space; and an ion conductive electrolyte filled in the space, wherein the conductive polymer layer of the cathode that is in contact with the ion conductive electrolyte expresses a redox capacity when a voltage is applied between the anode and the cathode. In the present invention, a cathode having a contact resistance between the conductive substrate and the conductive polymer layer of 1 $\Omega cm^2$ or less is used in order to express the redox capacity with high reliability. The electrolytic capacitor of the present invention can be manufactured by a cathode forming step, an anode forming step, and an electrolyte filling step, as described below. Each process will be described in detail below.

(1) A Cathode Forming Step

The cathode in the electrolytic capacitor of the present invention has a conductive substrate and a conductive polymer layer placed on the surface of the conductive substrate. As a conductive substrate, a substrate functioning as a current collector can be used without any particular limitation, as long as the contact resistance between the conductive polymer layer and the conductive substrate can be set to 1 $\Omega cm^2$ or less. The conductive substrate can be composed of one conductive layer or plural different conductive layers. In the case of plural layers, they can be used as the conductive substrate even if an insulating layer exists between the conductive layers, as long as a part of the insulating layer is broken and the conductive layers are electrically connected. For example, a foil of valve metal such as aluminum, tantalum, niobium, titanium, zirconium used for a cathode in conventional electrolytic capacitors, or a foil having an increased surface area by subjecting the valve metal foil to a chemical or electrochemical etching process, can be used as the conductive substrate, and an alloy such as an aluminum-copper alloy can be used as the conductive substrate. A naturally oxidized film generally exists on the surface of the valve metal foil, and even if a chemical oxide film formed by chemical conversion treatment using a chemical conversion liquid such as an ammonium borate aqueous solution, an ammonium adipate aqueous solution, or an ammonium phosphate aqueous solution exists on the surface of the valve metal foil, the valve metal foil can be used as the conductive substrate by partially breaking the oxide film in the process of providing an inorganic conductive layer comprising an inorganic conductive material on the surface of the oxide film, causing the conductive layer and the valve metal foil to conduct, and adjusting the contact resistance between the conductive substrate and the conductive polymer layer at the cathode to 1 $\Omega cm^2$ or less. The type of inorganic conductive material for forming the inorganic conductive layer and the method for forming the inorganic conductive layer are not particularly limited as long as the contact resistance between the conductive substrate and the conductive polymer layer at the cathode can be adjusted to 1 $\Omega cm^2$ or less. For example, in the process of forming the inorganic conductive layer by laminating an inorganic conductive material such as carbon, titanium, platinum, gold, silver, cobalt, nickel, and iron on the oxide film by means of vacuum deposition, sputtering, ion plating, coating, electrolytic plating, electroless plating, or the like, a part of the oxide film can be broken, and the inorganic conductive layer and the valve metal foil can be electrically connected to each other.

As the valve metal foil, an aluminum foil or an aluminum foil subjected to etching treatment as necessary is preferable because it exhibits good corrosion resistance against an electrolytic solution. When the aluminum foil is used, since a naturally oxidized film or a chemical oxide film generally exists, it is preferable that an inorganic conductive layer is provided on the aluminum oxide film as described above, a part of the aluminum oxide film is broken during this process, and the inorganic conductive layer and the aluminum foil are electrically conducted. When a titanium vapor deposited film is used as the inorganic conductive layer, atoms in the surrounding atmosphere during the vapor deposition process can be included, and for example, nitrogen or carbon can be included to form a titanium nitride vapor deposited film and a titanium carbide vapor deposited film. If the inorganic conductive layer is a layer comprising at least one inorganic conductive material selected from the group consisting of carbon, titanium, titanium nitride, titanium carbide and nickel, a cathode having excellent durability can be preferably obtained. Among them, a titanium carbide vapor deposited film and a carbon vapor deposited film are preferable because they give a polymerized film exhibiting stable characteristics in the electrolytic polymerization shown below, and a carbon coated layer is preferable because it is excellent in productivity.

A conductive polymer layer is placed on the surface of the conductive substrate. When the inorganic conductive layer is provided, the conductive polymer layer is placed on the surface of the inorganic conductive layer. The conductive polymer layer can be an electropolymerized film or a chemically polymerized film, or the conductive polymer layer can be formed using a dispersion liquid comprising at least particles of a conductive polymer and a dispersion medium.

The electrolytic polymerization film is formed by introducing the conductive substrate and a counter electrode into a polymerization liquid comprising at least a monomer, a supporting electrolyte and a solvent, and applying a voltage between the conductive substrate and the counter electrode. As the counter electrode, a plate or a net of platinum, nickel, steel, etc., can be used. In the process of electrolytic polymerization, anions released from the supporting electrolyte are contained in the conductive polymer layer as dopants.

As a solvent of the polymerization liquid for electrolytic polymerization, a solvent which can dissolve a desired amount of monomer and supporting electrolyte and does not adversely affect electrolytic polymerization can be used without particular limitation. Examples include water, methanol, ethanol, isopropanol, butanol, ethylene glycol, acetonitrile, butyronitrile, acetone, methyl ethyl ketone, tetrahydrofuran, 1,4-dioxane, γ-butyrolactone, methyl acetate, ethyl acetate, methyl benzoate, ethyl benzoate, ethylene carbonate, propylene carbonate, nitromethane, nitrobenzene, sulfolane, and dimethylsulfolane. These solvents can be used alone or in a mixture of two or more. The use of a solvent containing water in an amount of 80 mass % or more of the total solvent, particularly a solvent composed only of water, is preferable because a dense and stable electrolytic polymerization membrane can be obtained.

As a monomer contained in the polymerization liquid for electrolytic polymerization, a monomer having a π-conjugated double bond which has been conventionally used for producing a conductive polymer can be used without any particular limitation. Representative monomers are exemplified below. These monomers can be used alone or as a mixture of two or more.

First, thiophene and thiophene derivatives, including 3-alkylthiophene such as 3-methylthiophene and 3-ethylthiophene, 3,4-dialkylthiophene such as 3,4-dimethylthiophene and 3,4-diethylthiophene, 3-alkoxythiophene such as 3-methoxythiophene and 3-ethoxythiophene, 3,4-dialkoxythiophene such as 3,4-dimethoxythiophene and 3,4-diethoxythiophene, 3,4-alkylenedioxythiophene such as 3,4-methylenedioxythiophene, 3,4-ethylenedioxythiophene and 3,4-(1,2-propylenedioxy)thiophene, 3,4-alkyleneoxythiathiophene such as 3,4-methyleneoxythiathiophene, 3,4-ethyleneoxythiathiophene and 3,4-(1,2-propyleneoxythia)thiophene, 3,4-alkylenedithiathiophene such as 3,4-methylenedithiathiophene, 3,4-ethylenedithiathiophene and 3,4-(1,2-propylenedithia)thiophene, and alkylthieno[3,4-b]thiophene such as thieno[3,4-b]thiophene, isopropylthieno[3,4-b]thiophene and t-butyl-thieno[3,4-b]thiophene, are exemplified.

Also, pyrrole and pyrrole derivatives, including N-alkylpyrrole such as N-methylpyrrole and N-ethylpyrrole, 3-alkylpyrrole such as 3-methylpyrrole and 3-ethylpyrrole, 3-alkoxypyrrole such as 3-methoxypyrrole and 3-ethoxypyrrole, N-phenylpyrrole, N-naphthylpyrrole, 3,4-dialkylpyrrole such as 3,4-dimethylpyrrole and 3,4-diethylpyrrole, and 3,4-dialkoxypyrrole such as 3,4-dimethoxypyrrole and 3,4-diethoxypyrrole, are exemplified. Further, aniline and aniline derivatives, including 2,5-dialkylaniline such as 2,5-dimethylaniline and 2-methyl-5-ethylaniline, 2,5-dialkoxyaniline such as 2,5-dimethoxyaniline and 2-methoxy-5-ethoxyaniline, 2,3,5-trialkoxyaniline such as 2,3,5-trimethoxyaniline and 2,3,5-triethoxyaniline, and 2,3,5,6-tetraalkoxyaniline such as 2,3,5,6-tetramethoxyaniline and 2,3,5,6-tetraethoxyaniline, and furan and furan derivatives, including 3-alkylfuran such as 3-methylfuran and 3-ethylfuran, 3,4-dialkylfuran such as 3,4-dimethylfuran and 3,4-diethylfuran, 3-alkoxyfuran such as 3-methoxyfuran and 3-ethoxyfuran, and 3,4-dialkoxyfuran such as 3,4-dimethoxyfuran and 3,4-diethoxyfuran, can be exemplified.

As the monomer, a monomer selected from the group consisting of thiophenes having substituents at the 3-position and the 4-position is preferably used. The substituents at the 3 and 4 positions of the thiophene ring can form a ring with carbons at the 3 and 4 positions. In particular, 3,4- ethylenedioxythiophene is preferable because it provides a conductive polymer layer that exhibits high redox activity and excellent heat resistance.

As a supporting electrolyte contained in the polymerization liquid for electrolytic polymerization, a chemical compound which releases a dopant contained in a conventional conductive polymer can be used without any particular limitation. For example, an inorganic acid such as boric acid, nitric acid, phosphoric acid, tungstophosphoric acid and molybdophosphoric acid, an organic acid such as acetic acid, oxalic acid, citric acid, ascotic acid, tartaric acid, squaric acid, rhodizonic acid, croconic acid and salicylic acid, a sulfonic acid such as methanesulfonic acid, dodecylsulfonic acid, trifluoromethanesulfonic acid, p-toluenesulfonic acid, dodecylbenzenesulfonic acid, 1,2-dihydroxy-3,5-benzenedisulfonic acid, naphthalenesulfonic acid, naphthalenedisulfonic acid, propylnaphthalenesulfonic acid and butylnaphthalenesulfonic acid, and a salt thereof can be used as the supporting electrolyte. Further, a poly carboxylic acid such as polyaclylic acid, polymethacrylic acid and polymaleic acid, a polysulfonic acid such as polystyrene sulfonic acid and polyvinyl sulfonic acid, and a salt thereof can be used as the supporting electrolyte.

Furthermore, a boron complex such as borodisalicylic acid, borodioxalic acid, borodimalonic acid, borodisuccinic acid, borodiadipic acid, borodimaleic acid, borodiglycolic acid, borodilactic acid, borodihydroxyisobutyric acid, borodimalic acid, boroditartaric acid, borodicitric acid, borodiphthalic acid, borodihydroxybenzoic acid, borodimandelic acid and borodibenzylic acid, a sulfonylimidic acid represented by Formula (I) or Formula (II)

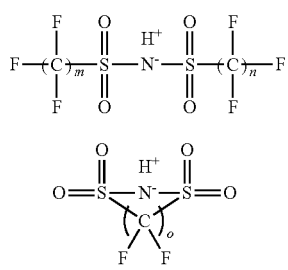

where m is an integer of 1 to 8, preferentially an integer of 1 to 4, and especially preferably 2, n is an integer of 1 to 8, preferentially an integer of 1 to 4, and especially preferably 2, and o is an integer of 2 or 3, and a salt thereof can also be used as the supporting electrolyte.

As the salt, an alkali metal salt such as lithium salt, sodium salt and potassium salt, an ammonium salt, an alkylammonium salt such as ethylammonium salt and butylammonium salt, a dialkylammonium salt such as diethylammonium salt and dibutylammonium salt, a trialkylammonium salt such as triethylammonium salt and tributylammonium salt, and a tetraalkylammonium salt such as tetraethylammonium salt and tetrabutylammonium salt can be exemplified.

These supporting electrolytes can be used alone or in combination of 2 or more, and depending on the type of supporting electrolyte, the supporting electrolyte can be used in an amount equal to or less than the saturated solubility in the polymerization liquid and at a concentration that provides a sufficient current for electrolytic polymerization, preferably 10 mmol or more per liter of water.

It is preferable to use an electrolytic polymerization liquid in which borodisalicylic acid or its salt as a supporting electrolyte is dissolved into a solvent having a large amount of water, preferably a solvent having water in an amount of 80 mass %, particularly preferably a solvent composed only of water, because the frequency dependence of the capacitor capacity is improved and a high capacitor capacity can be obtained even under a condition of a high frequency by the conductive polymer layer containing a borodisalicylate ion as a dopant. It has also been found that the frequency dependence of the capacitor capacity is further improved when an electrolytic polymerization liquid is used in which borodisalicylic acid or its salt as a supporting electrolyte is dissolved into a solvent having a large amount of water, preferably a solvent having water in an amount of 80 mass %, especially a solvent composed only of water, an anionic surfactant is made to coexist, and in which the monomer is solubilized or emulsified in the solvent by the surfactant. Examples of an anionic surfactant that can be used are: a fatty acid salt surfactant such as sodium laurate, sodium palmitate and sodium stearate, an amino acid surfactant such as sodium lauroyl glutamate, sodium lauroyl aspartate and sodium lauroyl methylalanine, a sulfuric ester surfactant, for example, an alkyl sulfuric ester salt such as sodium dodecyl sulfate and sodium myristyl sulfate, and an alkyl ether sulfuric ester salt such as sodium polyoxyethylene lauryl ether sulfate and sodium polyoxyethylene alkyl ether sulfate, a sulfonic acid type surfactant, for example, an alkanesulfonate such as sodium decanesulfonate and sodium dodecanesulfonate, an alkylbenzenesulfonate such as sodium octylbenzenesulfonate and sodium dodecylbenzenesulfonate, an alkylnaphthalenesulfonate such as sodium isopropylnaphthalenesulfonate and sodium butylnaphthalenesulfonate, a polymeric sulfonate such as sodium polystyrene sulfonate, an olefin sulfonate such as sodium tetradecene sulfonate, a sulfo fatty acid ester salt such as sodium dioctyl sulfosuccinate, and an alkyl phosphoric ester surfactant such as sodium lauryl phosphate, sodium myristyl phosphate and sodium polyoxyethylene lauryl phosphate. The anionic surfactants can be used alone or can be used as a mixture of two or more, and can be used in an amount sufficient to solubilize or emulsify a desired amount of monomer. It is preferable that the anionic surfactant is a sulfonic acid surfactant or a sulfuric ester surfactant because an electrolytic capacitor that is especially excellent in frequency characteristics can be obtained.

The electrolytic polymerization is carried out by one of a potentiostatic method, a galvanostatic method, and a potential sweeping method. In the case of the potentiostatic method, a potential of 1.0 to 1.5 V with respect to the saturated calomel electrode is suitable, depending on the kind of monomer, in the case of the galvanostatic method, a current value of 1 to 10000 $\mu A/cm^2$ is suitable, depending on the kind of monomer, and in the case of the potential sweeping method, it is preferable to sweep the range of 0 to 1.5 V with respect to the saturated calomel electrode at a rate of 5 to 200 mV/sec, depending on the kind of monomer. The polymerization temperature is not strictly limited, but is generally in the range of 10 to 60 degrees centigrade. The polymerization time is not strictly limited, but generally range from 1 minute to 10 hours.

The formation of the chemically polymerized film can be carried out by a method of preparing a solution obtained by dissolving both a monomer and an oxidizing agent in a solvent, applying the solution to the surface of the conductive substrate by brushing, dropping, dipping, spraying, etc., and drying the surface of the conductive substrate, or a method of preparing a solution by dissolving a monomer in a solvent and a solution obtained by dissolving an oxidizing agent in a solvent, and applying these solutions alternately to the surface of the conductive substrate by brushing, dropping, dipping, spraying, etc., and drying the same. As the solvent, for example, water, methanol, ethanol, isopropanol, butanol, ethylene glycol, acetonitrile, butyronitrile, acetone, methyl ethyl ketone, tetrahydrofuran, 1,4-dioxane, γ-butyrolactone, methyl acetate, ethyl acetate, methyl benzoate, ethyl benzoate, ethylene carbonate, propylene carbonate, nitromethane, nitrobenzene, sulfolane and dimethyl sulfolane can be used. These solvents can be used alone or in a mixture of two or more. As the monomer, a monomer having a π-conjugated double bond, for example, a monomer exemplified for electrolytic polymerization can be used. These monomers can be used alone or as a mixture of two or more. As the monomer, a monomer selected from thiophenes having substituents at the 3-position and the 4-position is preferable, especially 3,4-ethylenedioxythiophene is preferable. As the oxidizing agent, a trivalent iron salt such as iron(III) p-toluenesulfonate, iron(III) naphthalenesulfonate or iron(III) anthraquinone sulfonate, or a persulfate salt such as ammonium peroxodisulfate or sodium peroxodisulfate can be used; a single compound can be used, or two or more compounds can be used. The polymerization temperature is not strictly limited, but is generally in the range of 10 to 60 degrees centigrade. The polymerization time is not strictly limited, but generally range from 1 minute to 10 hours.

Further, the conductive polymer layer can be formed by applying a dispersion liquid containing at least particles of a conductive polymer and a dispersion medium to the surface of the conductive substrate by a process of coating, dripping, etc., and drying the surface of the conductive substrate. As the dispersion medium in the dispersion liquid, for example, water, methanol, ethanol, isopropanol, butanol, ethylene glycol, acetonitrile, butyronitrile, acetone, methyl ethyl ketone, tetrahydrofuran, 1,4-dioxane, γ-butyrolactone, methyl acetate, ethyl acetate, methyl benzoate, ethyl benzoate, ethylene carbonate, propylene carbonate, nitromethane, nitrobenzene, sulfolane and dimethyl sulfolane can be used, but water is preferably used as the dispersion medium. The dispersion liquid can be obtained, for example, by adding a monomer, an acid or its salt which releases a dopant, and an oxidizing agent to water, agitating the mixture until the chemical oxidative polymerization is completed, removing the oxidizing agent and the residual monomer by purification means such as ultrafiltration, cation exchange and anion exchange, and then applying dispersion treatment such as ultrasonic dispersion treatment, high-speed fluid dispersion treatment, and high-pressure dispersion treatment as necessary. Moreover, the dispersion liquid can be obtained by adding a monomer and an acid or a salt thereof releasing a dopant to water, performing electrolytic oxidative polymerization while stirring, removing the residual monomer by purification means such as ultrafiltration, cation exchange and anion exchange, and then performing dispersion treatment such as ultrasonic dispersion treatment, high-speed fluid dispersion treatment and high-pressure dispersion treatment as necessary. Further, the dispersion liquid can be obtained by filtering the liquid obtained by the abovementioned chemical oxidation polymerization method or electrolytic polymerization method to separate agglomerates, washing the agglomerates sufficiently, adding the agglomerates to water, and applying dispersion treatment such as ultrasonic dispersion treatment, high-speed fluid dispersion treatment, and high-pressure dispersion treatment to the resulting mixture. The content of particles of the conductive polymer in the dispersion liquid is generally in the range of 1.0 to 3.0 mass %, and preferably in the range of 1.5 to 2.0 mass %.

By using a cathode with a thin conductive polymer layer, the size of the cathode can be reduced and the capacity per unit volume of the capacitor can be improved. The thickness of the conductive polymer layer of the cathode is preferably in the range of 200 to 2450 nm. When the thickness of the conductive polymer layer is less than 200 nm, the high-temperature durability tends to be lowered, and when the thickness of the conductive polymer layer is more than 2450 nm, the temperature dependency of the capacity becomes large and it becomes difficult to contribute to the miniaturization of the electrolytic capacitor.

The conductive polymer layer of the cathode is preferably formed by electrolytic polymerization. By electrolytic polymerization, a conductive polymer layer that is excellent in mechanical strength can be formed from a small amount of monomer on the surface of the conductive substrate in a short time. Further, electrolytic polymerization provides a thin, dense and uniform conductive polymer layer, and a suitable conductive polymer layer having a thickness in the range of 200 to 2450 nm can be readily obtained. On the other hand, a chemically polymerized film has a non-uniform film quality and a thickness of at least about 3 μm, so it is not suitable for miniaturization of a capacitor. Further, in order to obtain a suitable conductive polymer layer having a thickness in the range of 200 to 2450 nm by using a dispersion liquid, it is generally necessary to repeat the steps of applying the dispersion liquid to the conductive substrate and drying the dispersion liquid. In addition, for unknown reasons at present, it has been found that electrolytic capacitors with a cathode having a conductive polymer layer obtained from a dispersion liquid have a lower capacity and a higher equivalent series resistance compared to electrolytic capacitors with a cathode having an electropolymerized film having the same thickness.

After the conductive polymer layer is formed on the surface of the conductive substrate by the abovementioned process, the contact resistance between the conductive substrate and the conductive polymer layer is measured by the method described with reference to FIG. 1. If the measured contact resistance is less than or equal to 1 $\Omega cm^2$, the resulting cathode can be used for an electrolytic capacitor of the present invention. The contact resistance between the conductive substrate and the conductive polymer layer is preferably 0.06 $\Omega cm^2$ or less. When the contract resistance is 0.06 $\Omega cm^2$ or less, a high capacity can be obtained even under conditions of a high frequency, and therefore an electrolytic capacitor exhibiting a high capacity in a wide frequency range can be obtained.

(2) An Anode Forming Step

The anode in the electrolytic capacitor of the present invention has a substrate made of a valve metal such as aluminum, tantalum, niobium, titanium or zirconium, and a dielectric layer placed on the surface of the substrate and made of an oxide of the valve metal. As a substrate for the anode, it is preferable that the surface area is increased by applying a chemical or electrochemical etching treatment to the foil of the valve metal by a known method, and an aluminum foil subjected to etching treatment is particularly preferable. The dielectric layer on the surface of the substrate can be formed by a known method in which the substrate is subjected to a chemical conversion treatment using a chemical conversion liquid such as an ammonium borate aqueous solution, an ammonium adipate aqueous solution or an ammonium phosphate aqueous solution (3) An Electrolyte Filling Step In this step, the cathode obtained in the abovementioned cathode forming step and having the conductive substrate and the conductive polymer layer placed on the surface of the conductive substrate, and the anode obtained in the anode forming step and having the substrate made of a valve metal and a dielectric layer placed on the surface of the substrate and made of an oxide of the valve metal are arranged and combined so that the conductive polymer layer of the cathode and the dielectric layer of the anode face each other with a space open, and then an ion conductive electrolyte is filled in the space.

As the ion conductive electrolyte, a known ion conductive electrolyte having no electron conductivity can be used without any particular limitation. First, an electrolytic solution used for conventional electrolytic capacitors, such as an electrolytic solution in which a solute such as a benzoate salt, a butyrate salt, a phthalate salt, an isophthalate salt, a terephthalate salt, a salicylate salt, a tartrate salt, an oxalate salt, a malonate salt, a malate salt, a glutarate salt, an adipate salt, an azelate salt, a maleate salt, a fumarate salt, a citrate salt, a pyromellitate salt, a trimellitate salt, a 1,6-decane dicarboxylate salt, a formate salt, an acetate salt, a glycolate salt, a lactate salt, a 1-naphthoate salt, a mandelate salt, a citraconate salt, a 2,4-dihydroxybenzoate salt, a 2,5-dihydroxybenzoate salt, a 2,6-dihydroxybenzoate salt, a borodisalicylate salt, a borodioxalate salt and a borodimalonate salt is dissolved in a solvent such as γ-butyrolactone, δ-valerolactone, ethylene glycol, diethylene glycol, propylene glycol, methyl cellosolve, ethylene glycol monomethyl ether, sulfolane, propylene carbonate, acetonitrile and water can be used. Examples of the salt include an amidinium salt, a phosphonium salt, an ammonium salt, an amine salt, an alkali metal salt and the like. The carboxylate salt is preferable as the solute, and when the carboxylate salt is contained in a large amount, the redox capacity by the conductive polymer layer of the cathode is increased. The content of the carboxylate salt in the electrolytic solution is preferably at least 0.1 M in concentration and at most the saturated dissolved amount in the electrolytic solution. In particular, the amidinium salt is preferred because it significantly increases the redox capacity by the conductive polymer layer of the cathode. Examples of the amidinium salt are: an imidazolium salt such as 1,3-dimethylimidazolium salt, 1-ethyl-3-methylimidazolium salt and 1-methyl-2,3-dimethylimidazolium salt; an imidazolinium salt such as 1,2,3,4-tetramethylimidazolinium salt, 1,3-dimethyl-2,4-diethylimidazolinium salt and 1,2-dimethyl-3,4-diethylimidazolinium salt; a pyrimidinium salt such as 1,3-dimethyl-1,4,5,6-tetrahydropyrimidinium salt, 1,2,3-trimethyl-1,4,5,6-tetrahydropyrimidinium salt and 1,3-dimethyl-1,4-dihydropyrimidinium salt; and a chain amidinium salt such as formamidinium salt, acetamidinium salt and benzylamidinium salt. The solvent of the electrolytic solution can be a single compound or a mixture of two or more compounds, and the solute can be a single compound or a mixture of two or more compounds.

The electrolytic solution may comprise known additives in addition to the solvent and solute described above, for example, a phosphoric acid compound such as phosphoric acid and phosphoric ester, a boric acid compound such as boric acid, a sugar alcohol such as mannite, a complex compound of boric acid and sugar alcohol, and a polyoxyalkylene polyol such as polyethylene glycol, polyglycerol and polypropylene glycol, etc., for the purpose of improving the voltage resistance of the capacitor, and further, a nitro compound such as nitrophenol, nitrobenzoic acid, nitroanisole and nitrobenzyl alcohol for the purpose of absorbing hydrogen that is rapidly generated especially at high temperatures. The electrolytic solution can comprise a gelling agent. Further, a normal temperature molten salt (ionic liquid) can be used as the ion conductive electrolyte.

For example, this step can be carried out by impregnating the electrolytic solution or the ionic liquid into a capacitor element formed by laminating the cathode having a strip shape and the anode having a strip shape via a separator so that the conductive polymer layer of the cathode and the dielectric layer of the anode face each other and then winding the laminated layer. Also, this step can be carried out by impregnating the electrolytic solution or the ionic liquid into a capacitor element formed by laminating the cathode having a desired shape and the anode having a desired shape through the separator so that the conductive polymer layer of the cathode and the dielectric layer of the anode face each other. The electrolytic solution or the ionic liquid may be impregnated in a capacitor element in which plural sets of cathodes and anodes are alternately laminated so that the conductive polymer layer of the cathodes and the dielectric layer of the anodes face each other with a separator interposed therebetween. As the separator, a woven or nonwoven fabric composed of cellulosic fiber can be used, including Manila paper, craft paper, esparto paper, hemp paper, cotton paper, rayon and mixed paper thereof. Also, a woven or nonwoven fabric composed of resin including a polyester resin such as polyethylene terephthalate, polybutylene terephthalate, polyethylene naphthalate and a derivative thereof, a polytetrafluoroethylene resin, a polyvinylidene fluoride resin, a vinylone resin, a polyamide resin such as aliphatic polyamide, semi-aromatic polyamide and wholly aromatic polyamide, a polyimide resin, a polyethylene resin, a polypropylene resin, a trimethylpentene resin, a polyphenylene sulfide resin and an acrylic resin, a glass paper, a mixed paper of glass paper with Manila paper or craft paper, etc. can be used. Impregnation with the electrolytic solution or the ionic liquid may be carried out after the capacitor element is housed in an exterior case having an opening. When an electrolytic solution comprising a gelling agent is used, the electrolytic solution can be gelatinized by impregnating the capacitor element with the electrolytic solution and then heating.

The step can also be performed by forming a capacitor element in which the conductive polymer layer of the cathode and the dielectric layer of the anode face each other through an insulating spacer and then filling the ion conductive electrolyte into a space formed by the spacer. In this form, a gel electrolyte obtained by absorbing the electrolytic solution in polyvinylidene fluoride, polyacrylonitrile or the like, or a solid electrolyte composed of a complex of the above salt and a polymer compound such as polyethylene oxide, polymethacrylate or polyacrylate can also be used as an ion conductive electrolyte in addition to the abovementioned electrolytic solution or ionic liquid. It is possible that the gel or solid electrolyte is laminated on the conductive polymer layer of the cathode and then the anode is laminated on the electrolyte so that the dielectric layer is in contact with it.

In the present invention, the conductive polymer layer of the cathode need to be in direct contact with the ion conductive electrolyte, and the conductive polymer layer of the cathode is not in direct contact with the anode but is connected (conducted) to the anode via the ion conductive electrolyte, but the dielectric layer of the anode can be in direct contact with the ion conductive electrolyte or indirectly connected to the ion conductive electrolyte via another conductive material. A conductive polymer layer can be used as the suitable conductive material. The conductive polymer layer can be formed on the surface of the dielectric layer of the anode by an electrolytic polymerization method or a chemical polymerization method, or can be formed by applying a dispersion liquid containing at least particles of the conductive polymer and a dispersion medium to the surface of the dielectric layer of the anode and drying it, after forming the anode in the anode forming step. Since the above description of the formation of the conductive polymer layer of the cathode can be directly applied to the conductive polymer layer, further description thereof will be omitted. When the conductive polymer layer is provided adjacent to the dielectric layer of the anode, it is possible that this conductive polymer layer and the conductive polymer layer of the cathode is arranged and combined so that they face each other with a space open and then the space is filled with the ion conductive electrolyte.

When a voltage is applied between the anode and the cathode of the capacitor element contained and sealed in the outer case, the redox capacity of the conductive polymer layer in the cathode that is in contact with the ion conductive electrolyte is reliably developed, so that the cathode exhibits a remarkably increased capacity, and therefore the capacity per unit volume of the electrolytic capacitor is remarkably increased. In the process of redox capacity expression, ions in the ion conductive electrolyte are taken into the conductive polymer layer of the cathode.

EXAMPLES

The present invention is explained in the following examples, though the present invention is not limited to the following examples.

(1) Influence of the Contact Resistance Between the Conductive Substrate and the Conductive Polymer Layer a) Use of an Etched Aluminum Foil with Naturally Oxidized Film as a Conductive Substrate Comparative Example 1

An etched aluminum foil was punched to a projection area of 2 cm$^2$ to obtain an aluminum foil having a naturally oxidized aluminum oxide film on its surface (conductive substrate A), and then a copper foil was fixed to the surface of the naturally oxidized aluminum oxide film through the carbon paste and the silver paste in the same manner as described with reference to FIG. 1, and the AC impedance measurement was performed between the copper foil and the aluminum foil. When the value of the real component of the Cole-Cole plot was obtained as the resistance of the conductive substrate A, a value of $1.2 \times 10^{-1}$ Ωcm$^2$ was obtained.

A polymerization liquid for chemical polymerization was obtained by mixing an ethanol solution containing 50 mass % of 3,4-ethylenedioxythiophene (3,4-ethylenedioxythiophene is hereinafter referred to as "EDOT" and poly(3,4-ethylenedioxythiophene) is referred to as "PEDOT") and an ethanol solution containing 60 mass % of iron(III) p-toluenesulfonate as an oxidizing agent in a volume ratio of 1:2. Then, the polymerization liquid for chemical polymerization was applied to the surface of the naturally oxidized aluminum oxide film of the conductive substrate A, and dried at 150 degrees centigrade for 20 minutes to allow chemical polymerization to proceed, thereby obtaining a cathode in which the PEDOT layer on the naturally oxidized aluminum oxide film is about 5 μm thick. A copper foil was fixed to the surface of the PEDOT layer of the cathode through the carbon paste and the silver paste according to the method described with reference to FIG. 1, and the AC impedance measurement was performed between the copper foil and the aluminum foil. The contact resistance between the conductive substrate A and the PEDOT layer was 47.1 Ωcm$^2$.

An aluminum oxide film was formed on the surface of an aluminum foil having an increased surface area by etching treatment by chemical conversion treatment, and then punched out to a projection area of 2 cm$^2$ to obtain an anode (capacity: 370 μF/cm$^2$). Then, a capacitor element formed by laminating the abovementioned cathode (the cathode having the PEDOT layer and the conductive substrate A) and the abovementioned anode through a cellulosic separator was prepared, and the element was impregnated with an electrolytic solution prepared by dissolving an amidinium salt of phthalic acid in γ-butyrolactone at a concentration of 15 mass %, and packed with a laminated film. Then, an aging treatment was performed by applying a voltage of 2.9 V at a temperature of 110 degrees centigrade for 60 minutes, and a flat type electrolytic capacitor was obtained. The capacity of the capacitor was measured at 120 Hz and 1 kHz.

For comparison, as Conventional Example A, the conductive substrate A was used as a cathode instead of the abovementioned cathode having the PEDOT layer and the conductive substrate A, and a flat type electrolytic capacitor was obtained by the same procedure. The capacity of this capacitor was measured at 120 Hz and 1 kHz.

b) Use of a Substrate Formed by Depositing a Small Amount of Carbon on an Etched Aluminum Foil Having an Oxide Film Obtained by a Chemical Conversion Treatment as a Conductive Substrate Comparative Example 2

An aluminum oxide film having a withstand voltage of 5 V was formed on the surface of an etched aluminum foil, punched to a projection area of 2 cm$^2$, and carbon in an amount of 0.232 gm$^{-2}$ was evaporated on the surface of the aluminum oxide film to obtain a conductive substrate B. Then, a copper foil was fixed to the surface of the carbon vapor deposition film through the carbon paste and the silver paste in the same manner as described with reference to FIG. 1, and the AC impedance measurement was performed between the copper foil and the aluminum foil. When the value of the real component of the Cole-Cole plot was obtained as the resistance of the conductive substrate B, a value of 26.0 Ωcm$^2$ was obtained.

50 mL of distilled water was introduced into a glass container and heated to 40 degrees centigrade. To this liquid, 0.030 M of EDOT, 0.04 M of ammonium borodicalicylate and 0.04 M of sodium butylnaphthalenesulfonate were added and stirred to obtain a polymerization liquid for electrolytic polymerization in which EDOT was solubilized in water with sodium butylnaphthalenesulfonate. Next, the conductive substrate B (working electrode) and a counter electrode of a SUS mesh having an area of 10 cm$^2$ were introduced into the polymerization liquid for electrolytic polymerization, and a galvanostatic electrolytic polymerization was carried out under the condition of 500 μA/cm$^2$ for 2 minutes. The working electrode after polymerization was washed with water and dried at 100 degrees centigrade for 30 minutes to obtain a cathode having a thickness of 350 nm in the PEDOT layer on the carbon vapor deposition film. The thickness of the PEDOT layer is a value obtained by conducting galvanostatic electrolytic polymerization at a condition of 500 μA/cm² for plural times at different times, measuring the thickness of the PEDOT layer obtained in each experiment by using an atomic force microscope or a level difference meter, deriving a relational expression between the thickness of the PEDOT layer and the amount of charge, and then converting the amount of charge of electrolytic polymerization into the thickness of the PEDOT layer by using the derived relational expression.

A copper foil was fixed to the surface of the PEDOT layer of the cathode through the carbon paste and the silver paste according to the method described with reference to FIG. 1, and the AC impedance measurement was performed between the copper foil and the aluminum foil, and the contact resistance between the conductive substrate B and the PEDOT layer was 3.1 Ωcm².

Next, a capacitor element in which the anode used in Comparative Example 1 and the abovementioned cathode (the cathode having the PEDOT layer and the conductive substrate B) were laminated through a cellulosic separator was prepared, and a flat type electrolytic capacitor was obtained by the same procedure as that in Comparative Example 1. The capacity of the capacitor was measured at 120 Hz and 1 kHz.

For comparison, as Conventional Example B, the conductive substrate B was used as a cathode instead of the abovementioned cathode having the PEDOT layer and the conductive substrate B, and a flat type electrolytic capacitor was obtained by the same procedure. The capacity of this capacitor was measured at 120 Hz and 1 kHz.

c) Use of a Substrate Having an Increased Carbon Deposition Amount on an Etched Aluminum Foil Having an Oxide Film Obtained by a Chemical Conversion Treatment as a Conductive Substrate Example 1

An aluminum oxide film having a withstand voltage of 5 V was formed on the surface of an etched aluminum foil, punched to a projection area of 2 cm², and carbon in an amount of 0.431 gm⁻² was evaporated on the surface of the aluminum oxide film to obtain a conductive substrate C. Next, a copper foil was fixed to the surface of the carbon vapor deposition film through the carbon paste and the silver paste in the same manner as described with reference to FIG. 1, and the AC impedance measurement was performed between the copper foil and the aluminum foil. When the value of the real component of the Cole-Cole plot was obtained as the resistance of the conductive substrate C, a value of 5.5 Ωcm² was obtained.

Then, the conductive substrate C (working electrode) and the counter electrode of a SUS mesh having an area of 10 cm² were introduced into the polymerization liquid for electrolytic polymerization used in Comparative Example 2, and a galvanostatic electrolytic polymerization was conducted under the condition of 500 μA/cm² for 2 minutes. The working electrode after polymerization was washed with water and dried at 100 degrees centigrade for 30 minutes to obtain a cathode having a thickness of 350 nm in the PEDOT layer on the carbon vapor deposition film. A copper foil was fixed to the surface of the PEDOT layer of the cathode through the carbon paste and the silver paste according to the method described with reference to FIG. 1, and the AC impedance measurement was performed between the copper foil and the aluminum foil, and the contact resistance between the conductive substrate C and the PEDOT layer was 0.9 Ωcm².

Next, a capacitor element in which the anode used in Comparative Example 1 and the abovementioned cathode (the cathode having the PEDOT layer and the conductive substrate C) were laminated through a cellulosic separator was prepared, and a flat type electrolytic capacitor was obtained by the same procedure as that in Comparative Example 1. The capacity of the capacitor was measured at 120 Hz and 1 kHz.

For comparison, as Conventional Example C, the conductive substrate C was used as a cathode instead of the abovementioned cathode having the PEDOT layer and the conductive substrate C, and a flat type electrolytic capacitor was obtained by the same procedure. The capacity of this capacitor was measured at 120 Hz and 1 kHz.

d) Use of a Substrate Prepared by Depositing Titanium Carbide on a Plain Aluminum Foil Having a Naturally Oxidized Film as a Conductive Substrate Example 2

An aluminum foil not subjected to etching treatment was punched to a projection area of 2 cm², and a titanium carbide vapor deposition film was formed on the surface of a naturally oxidized aluminum oxide film to obtain a conductive substrate D. Next, a copper foil was fixed to the surface of the titanium carbide deposited film through the carbon paste and the silver paste in the same manner as described with reference to FIG. 1, and the AC impedance measurement was performed between the copper foil and the aluminum foil. When the value of the real component of the Cole-Cole plot was obtained as the resistance of the conductive substrate D, a value of $2.4 \times 10^{-1}$ Ωcm² was obtained.

Next, the conductive substrate D (working electrode) and the counter electrode of a SUS mesh having an area of 10 cm² were introduced into the polymerization liquid for electrolytic polymerization used in Comparative Example 2, and a galvanostatic electrolytic polymerization was conducted under the condition of 500 μA/cm² for 2 minutes. The working electrode after polymerization was washed with water and dried at 100 degrees centigrade for 30 minutes to obtain a cathode having a thickness of 350 nm of the PEDOT layer on the titanium carbide evaporated film. A copper foil was fixed to the surface of the PEDOT layer of the cathode through the carbon paste and the silver paste according to the method described with reference to FIG. 1, and the AC impedance measurement was performed between the copper foil and the aluminum foil, and the contact resistance between the conductive substrate D and the PEDOT layer was $5.5 \times 10^{-2}$ Ωcm².

Next, a capacitor element in which the anode used in Comparative Example 1 and the abovementioned cathode (the cathode having the PEDOT layer and the conductive substrate D) were laminated through a cellulosic separator was prepared, and a flat type electrolytic capacitor was obtained by the same procedure as that in Comparative Example 1. The capacity of the capacitor was measured at 120 Hz and 1 kHz.

For comparison, as Conventional Example D, the conductive substrate D was used as a cathode instead of the abovementioned cathode having the PEDOT layer and the conductive substrate D, and a flat type electrolytic capacitor was obtained by the same procedure. The capacity of this capacitor was measured at 120 Hz and 1 kHz.

e) Use of a Substrate Formed by Coating Carbon on an Etched Aluminum Foil Having a Naturally Oxidized Film as a Conductive Substrate

Example 3

An etched aluminum foil was punched to a projection area of 2 cm$^2$, and a slurry containing graphite, carbon black and a binder was applied to the surface of a naturally oxidized aluminum oxide film and dried to form a carbon coating film, thereby obtaining a conductive substrate E. Next, a copper foil was fixed to the surface of the carbon coating film through the carbon paste and the silver paste in the same manner as described with reference to FIG. 1, and the AC impedance measurement was performed between the copper foil and the aluminum foil. When the value of the real component of the Cole-Cole plot was obtained as the resistance of the conductive substrate E, a value of 7.1×10$^{-3}$ Ωcm$^2$ was obtained.

Next, the conductive substrate E (working electrode) and the counter electrode of a SUS mesh having an area of 10 cm$^2$ were introduced into the polymerization liquid for electrolytic polymerization used in Comparative Example 2, and a galvanostatic electrolytic polymerization was conducted under the condition of 500 μA/cm$^2$ for 2 minutes. The working electrode after polymerization was washed with water and dried at 100 degrees centigrade for 30 minutes to obtain a cathode having a thickness of 350 nm in the PEDOT layer on the carbon coating film. A copper foil was fixed to the surface of the PEDOT layer of the cathode through the carbon paste and the silver paste according to the method described with reference to FIG. 1, and the AC impedance measurement was performed between the copper foil and the aluminum foil, and the contact resistance between the conductive substrate E and the PEDOT layer was 6.5×10$^{-3}$ Ωcm$^2$.

Next, a capacitor element in which the anode used in Comparative Example 1 and the abovementioned cathode (the cathode having the PEDOT layer and the conductive substrate E) were laminated through a cellulosic separator was prepared, and a flat type electrolytic capacitor was obtained by the same procedure as that in Comparative Example 1. The capacity of the capacitor was measured at 120 Hz and 1 kHz.

For comparison, as Conventional Example E, the conductive substrate E was used as a cathode instead of the abovementioned cathode having the PEDOT layer and the conductive substrate E, and a flat type electrolytic capacitor was obtained by the same procedure. The capacity of this capacitor was measured at 120 Hz and 1 kHz.

f) Use of a Substrate Formed by Depositing Titanium Carbide on an Etched Aluminum Foil Having an Oxide Film Obtained by a Chemical Conversion Treatment as a Conductive Substrate

Example 4

An aluminum oxide film having a withstand voltage of 5 V was formed on the surface of an aluminum foil subjected to the etching treatment, punched to a projection area of 2 cm$^2$, and a titanium carbide deposited film was formed on the surface of the aluminum oxide film to obtain a conductive substrate F. Next, a copper foil was fixed to the surface of the titanium carbide deposited film through the carbon paste and the silver paste in the same manner as described with reference to FIG. 1, and the AC impedance measurement was performed between the copper foil and the aluminum foil. When the value of the real component of the Cole-Cole plot was obtained as the resistance of the conductive substrate F, a value of 8.7×10$^{-3}$ Ωcm$^2$ was obtained.

Next, the conductive substrate F (working electrode) and the counter electrode of a SUS mesh having an area of 10 cm$^2$ were introduced into the polymerization liquid for electrolytic polymerization used in Comparative Example 2, and a galvanostatic electrolytic polymerization was conducted under the condition of 500 μA/cm$^2$ for 2 minutes. The working electrode after polymerization was washed with water and dried at 100 degrees centigrade for 30 minutes to obtain a cathode having a thickness of 350 nm of the PEDOT layer on the titanium carbide evaporated film. A copper foil was fixed to the surface of the PEDOT layer of the cathode through the carbon paste and the silver paste according to the method described with reference to FIG. 1, and the AC impedance measurement was performed between the copper foil and the aluminum foil, and the contact resistance between the conductive substrate F and the PEDOT layer was 3.7×10$^{-3}$ Ωcm$^2$.

Next, a capacitor element in which the anode used in Comparative Example 1 and the abovementioned cathode (the cathode having the PEDOT layer and the conductive substrate F) were laminated through a cellulosic separator was prepared, and a flat type electrolytic capacitor was obtained by the same procedure as that in Comparative Example 1. The capacity of the capacitor was measured at 120 Hz and 1 kHz.

For comparison, as Conventional Example F, the conductive substrate F was used as a cathode instead of the abovementioned cathode having the PEDOT layer and the conductive substrate F, and a flat type electrolytic capacitor was obtained by the same procedure. The capacity of this capacitor was measured at 120 Hz and 1 kHz.

Example 5

The polymerized liquid for chemical polymerization used in Comparative Example 1 was applied to the surface of the deposited titanium carbide film of the conductive substrate F used in Example 4 and dried at 150 degrees centigrade for 20 minutes to allow chemical polymerization to proceed, thereby obtaining a cathode having a thickness of about 5 μm in the PEDOT layer on the deposited titanium carbide film. A copper foil was fixed to the surface of the PEDOT layer of the cathode through the carbon paste and the silver paste according to the method described with reference to FIG. 1, and the AC impedance measurement was performed between the copper foil and the aluminum foil, and the contact resistance between the conductive substrate F and the PEDOT layer was 6.4×10$^{-3}$ Ωcm$^2$.

Next, a capacitor element in which the anode used in Comparative Example 1 and the abovementioned cathode (the cathode having the chemically polymerized PEDOT layer and the conductive substrate F) were laminated through a cellulosic separator was prepared, and a flat type electrolytic capacitor was obtained by the same procedure as that in Comparative Example 1. The capacity of the capacitor was measured at 120 Hz and 1 kHz.

g) Use of a Substrate Formed by Depositing Carbon on an Etched Aluminum Foil Having a Naturally Oxidized Film as a Conductive Substrate

Example 6

An aluminum foil wherein only the surface layer was etched was punched to a projection area of 2 cm$^2$, and a carbon vapor deposition film was formed on the surface of a naturally oxidized aluminum oxide film to obtain a conductive substrate G. Next, a copper foil was fixed to the surface of the carbon vapor deposition film through the carbon paste and the silver paste in the same manner as described with reference to FIG. 1, and the AC impedance measurement was performed between the copper foil and the aluminum foil. When the value of the real component of the Cole-Cole plot was obtained as the resistance of the conductive substrate G, a value of $2.2 \times 10^{-3}$ $\Omega cm^2$ was obtained.

Next, the conductive substrate G (working electrode) and the counter electrode of a SUS mesh having an area of 10 $cm^2$ were introduced into the polymerization liquid for electrolytic polymerization used in Comparative Example 2, and a galvanostatic electrolytic polymerization was conducted under the condition of 500 $\mu A/cm^2$ for 2 minutes. The working electrode after polymerization was washed with water and dried at 100 degrees centigrade for 30 minutes to obtain a cathode having a thickness of 350 nm in the PEDOT layer on the carbon vapor deposition film. A copper foil was fixed to the surface of the PEDOT layer of the cathode through the carbon paste and the silver paste according to the method described with reference to FIG. 1, and the AC impedance measurement was performed between the copper foil and the aluminum foil, and the contact resistance between the conductive substrate G and the PEDOT layer was $1.4 \times 10^{-3}$ $\Omega cm^2$.

Next, a capacitor element in which the anode used in Comparative Example 1 and the abovementioned cathode (the cathode having the PEDOT layer and the conductive substrate G) were laminated through a cellulosic separator was prepared, and a flat type electrolytic capacitor was obtained by the same procedure as that in Comparative Example 1. The capacity of the capacitor was measured at 120 Hz and 1 kHz.

For comparison, as Conventional Example G, the conductive substrate G was used as a cathode instead of the abovementioned cathode having the PEDOT layer and the conductive substrate G, and a flat type electrolytic capacitor was obtained by the same procedure. The capacity of this capacitor was measured at 120 Hz and 1 kHz.

Table 1 shows the capacity under 120 Hz and 1 kHz conditions for the capacitors of Examples 1 to 6, Comparative Examples 1 and 2, and Conventional Examples A to G.

TABLE 1

| | Cathode | Resistance ($\Omega cm^2$) | Capacity($\mu F$) 120 Hz | Capacity($\mu F$) 1 kHz |
|---|---|---|---|---|
| Comparative Example 1 | Chemically polymerized layer/ conductive substrate A | 47.1 | 189.3 | 176.5 |
| Conventional Example A | Conductive substrate A | $1.2 \times 10^{-1}$ | 201.0 | 192.3 |
| Comparative Example 2 | Electropolymerized layer/ conductive substrate B | 3.1 | 88.1 | 48.4 |
| Conventional Example B | Conductive substrate B | 26.0 | 51.4 | 45.7 |
| Example 1 | Electropolymerized layer/ conductive substrate C | 0.9 | 299.8 | 104.3 |
| Conventional Example C | Conductive substrate C | 5.5 | 121.4 | 67.8 |
| Example 2 | Electropolymerized layer/ conductive substrate D | $5.5 \times 10^{-2}$ | 310.8 | 272.0 |
| Conventional Example D | Conductive substrate D | $2.4 \times 10^{-1}$ | 16.0 | 10.7 |
| Example 3 | Electropolymerized layer/ conductive substrate E | $6.5 \times 10^{-3}$ | 324.3 | 280.9 |
| Conventional Example E | Conductive substrate E | $7.1 \times 10^{-3}$ | 225.1 | 206.0 |
| Example 4 | Electropolymerized layer/ conductive substrate F | $3.7 \times 10^{-3}$ | 320.1 | 279.5 |
| Example 5 | Chemically polymerized layer/ conductive substrate F | $6.4 \times 10^{-3}$ | 317.5 | 287.0 |
| Conventional Example F | Conductive substrate F | $8.7 \times 10^{-3}$ | 70.9 | 62.8 |
| Example 6 | Electropolymerized layer/ conductive substrate G | $1.4 \times 10^{-3}$ | 318.0 | 294.4 |
| Conventional Example G | Conductive substrate G | $2.2 \times 10^{-3}$ | 115.2 | 99.1 |

Table 1 shows that, comparing the capacity of the capacitor of Conventional Example A, which is equipped with the cathode consisting of the conductive substrate A, with the capacity of the capacitor of Comparative Example 1, which is equipped with the cathode having the chemically polymerized PEDOT layer formed on the surface of the conductive substrate A, the capacity of the capacitor of Comparative Example 1 is slightly smaller than that of the capacitor of Conventional Example A, but comparing the capacity of the capacitor of Conventional Example B, which is equipped with the cathode consisting of the conductive substrate B, with the capacity of the capacitor of Comparative Example 2, which is equipped with the cathode having the electropolymerized PEDOT layer formed on the surface of the conductive substrate B, the capacity of the capacitor of Comparative Example 2 is larger than that of the capacitor of Conventional Example B. This corresponds to the fact that, in the capacitor of Comparative Example 2, the contact resistance between the conductive substrate and the PEDOT layer at the cathode was reduced, so that electrons required to proceed the redox reaction of the PEDOT layer were slightly supplied from the conductive substrate to the PEDOT layer, and the PEDOT layer slightly developed the redox capacity. The PEDOT layer in the capacitor of Comparative Example 1 is formed by chemical polymerization and the PEDOT layer in the capacitor of Comparative Example 2 is formed by electrolytic polymerization, but the difference in the polymerization method of PEDOT does not affect the capacitor capacity, as can be seen from the comparison between the capacity of the capacitor of Example 4, which has the electropolymerized PEDOT layer, and the capacity of the capacitor of Example 5, which has the chemically polymerized PEDOT layer, and the difference between the capacity of the capacitor of Comparative Example 1 and the capacity of the capacitor of Comparative Example 2 is due to the difference in contact resistance between the conductive substrate and the PEDOT layer at the cathode.

In addition, Table 1 shows that, when the capacity of the capacitor of Conventional Example C, which is equipped with the cathode consisting of the conductive substrate C, is compared with the capacity of the capacitor of Example 1, which is equipped with the cathode having the electropolymerized PEDOT layer formed on the surface of the conductive substrate C, the capacity of the capacitor of Example 1 is significantly larger than that of the capacitor of Conventional Example C, particularly under the condition of 120 Hz. This corresponds to the fact that the contact resistance between the conductive substrate and the PEDOT layer at the cathode of the capacitor of Example 1 was further reduced compared to that of Comparative Example 2, so that electrons required to proceed the redox reaction of the PEDOT layer were sufficiently supplied from the conductive substrate to the PEDOT layer, and the expressed amount of the redox capacity of the PEDOT layer was significantly increased. Further, Table 1 shows that the capacitors of Examples 2 to 6 with a cathode having a further reduced contact resistance between the conductive substrate and the PEDOT layer exhibit significantly increased capacity at 1 kHz as well as at 120 Hz, compared to the capacitors of Conventional Examples D to G with a cathode consisting of the same conductive substrate.

As can be seen from Table 1, the capacity of the capacitors of Examples 1 to 6 under the 120 kHz condition does not differ significantly even though the capacity of the capacitors of Conventional Examples C to G that are equipped with the same conductive substrate has changed significantly. This shows that, when sufficient electrons to proceed with the redox reaction of the PEDOT layer are supplied from the conductive substrate to the PEDOT layer, the capacity of the cathode is determined predominantly by the redox capacity of the PEDOT layer, and in order to reliably express the redox capacity of the PEDOT layer at the cathode, the contact resistance between the conductive substrate and the PEDOT layer at the cathode needs to be 1 $\Omega cm^2$ or less.

Also, as is clear from Table 1, the capacity of the capacitors of Examples 2 to 6 under the condition of 1 kHz does not show a big difference either and shows a value close to the capacity under the condition of 120 Hz, in spite of the large change shown in the capacity of the capacitors of Conventional Examples D to G which are equipped with the same conductive substrate. This shows that the contact resistance between the conductive substrate and the PEDOT layer at the cathode needs to be 0.06 $\Omega cm^2$ or less in order to obtain an electrolytic capacitor that exhibits a high capacity even under conditions of a high frequency and a high capacity in a wide frequency range.

(2) Effect of a Solute in an Electrolytic Solution

As described above, in order to reliably express the redox capacity of the PEDOT layer at the cathode, the contact resistance between the conductive substrate and the PEDOT layer at the cathode needs to be set to 1 $\Omega cm^2$ or less, but it is considered that the amount of the redox capacity to be expressed also varies depending on the kind of solute and its concentration in an electrolytic solution. Therefore, the following experiments were conducted.

Example 7

An electrolyte was prepared by dissolving phthalic acid as a dicarboxylic acid, and a 1,2,3,4-tetramethylimidazolinium salt as a compound giving a counter cation in γ-butyrolactone. The concentration of phthalic acid was varied from 0.1 M to 1.2 M, and the concentrations of phthalic acid and the 1,2,3,4-tetramethylimidazolinium salt were the same. The cathode used in Example 1 (the cathode having the PEDOT layer and the conductive substrate C) was introduced into the resulting electrolyte, and the capacity of the cathode at 120 Hz was measured under the condition of 30 degrees centigrade.

Example 8

The procedure of Example 7 was repeated except that ethyldimethylamine was used instead of the 1,2,3,4-tetramethylimidazolinium salt as a compound to provide a counter cation, the concentration of phthalic acid was changed within the range of 0.1 M to 1.3 M, and the concentrations of phthalic acid and ethyldimethylamine were made identical.

Example 9

The procedure of Example 7 was repeated except that triethylamine was used instead of the 1,2,3,4-tetramethylimidazolinium salt as a compound to give a counter cation, the concentration of phthalic acid was changed in the range of 0.1 M to 1.3 M, and the concentrations of phthalic acid and triethylamine were made identical.

Example 10

The procedure of Example 7 was repeated except that diethylamine was used instead of the 1,2,3,4-tetramethylimidazolinium salt as a compound to give a counter cation, the concentration of phthalic acid was changed in the range of 0.1 M to 1.1 M, and the concentrations of phthalic acid and diethylamine were made identical.

Figure 2:
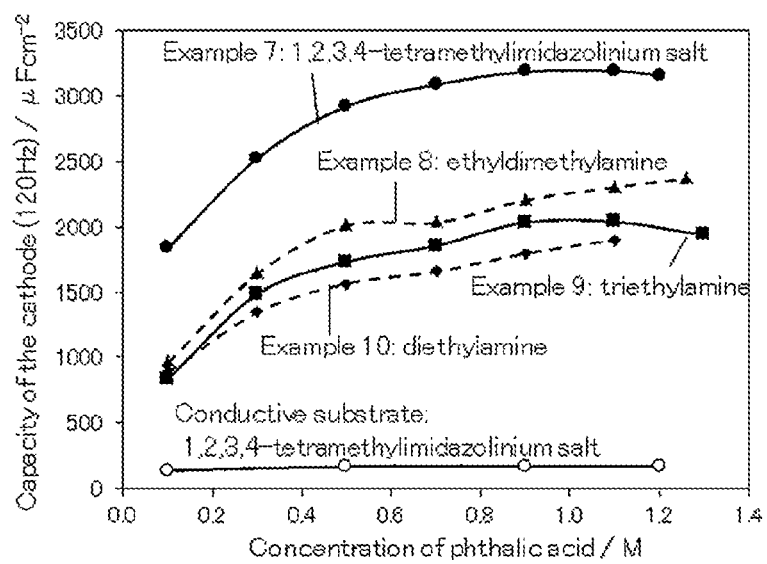
FIG. 2 shows the effect of the concentration of solute and the kind of counter cation used in an electrolytic solution on the capacity of a cathode.

FIG. 2 shows the capacity of the capacitors for Examples 7 to 10. FIG. 2 also shows the capacity of the conductive substrate C without a PEDOT layer introduced into the electrolyte used in Example 7, which was measured under the condition of 30 degrees centigrade and 120 Hz. The significant difference between the capacity of the conductive substrate and that of the cathode in Example 7 shown in FIG. 2 is due to the development of the redox capacity by the PEDOT layer. FIG. 2 shows that the 1,2,3,4-tetramethylimidazolinium cation, one of the amidinium cations, significantly increases the redox capacity by the PEDOT layer of the cathode. FIG. 2 also shows that a sufficiently increased redox capacity can be obtained when a solute composed of a phthalate anion and a counter cation is contained in the electrolytic solution in the range of 0.1 M to 1.3 M, preferably in the range of 0.3 M to 1.2 M.

INDUSTRIAL APPLICABILITY

The present invention provides a compact electrolytic capacitor having a large capacity.

What is claimed is:

1. An electrolytic capacitor comprising:
 a cathode comprising a conductive substrate and a conductive polymer layer placed on a surface of the conductive substrate;
 an anode comprising a substrate composed of a valve metal and a dielectric layer composed of an oxide of the valve metal that is placed on a surface of the substrate and is so placed that the dielectric layer and the conductive polymer layer of the cathode face each other through a space; and
 an ion conductive electrolyte having no electron conductivity which is filled in the space,
 the conductive polymer layer of the cathode that is in contact with the ion conductive electrolyte expressing a redox capacity when a voltage is applied between the anode and the cathode,
 wherein a contact resistance between the conductive substrate and the conductive polymer layer in the cathode is 1 $\Omega cm^2$ or less.

2. The electrolytic capacitor according to claim 1, wherein the contact resistance between the conductive substrate and the conductive polymer layer in the cathode is 0.06 $\Omega cm^2$ or less.

3. The electrolytic capacitor according to claim 2, wherein the conductive substrate comprises: a foil composed of a valve metal, an oxide film composed of an oxide of the valve metal that is placed on a surface of the foil; and an inorganic conductive layer comprising an inorganic conductive material that is placed on a surface of the oxide film, the inorganic conductive layer and the foil are electrically connected to each other, and the conductive polymer layer is placed on a surface of the inorganic conductive layer.

4. The electrolytic capacitor according to claim 3, wherein the foil is an aluminum foil and the oxide film is an aluminum oxide film.

5. The electrolytic capacitor according to claim 4, wherein the inorganic conductive material is at least one material selected from a group consisting of carbon, titanium, titanium nitride, titanium carbide, and nickel.

6. The electrolytic capacitor according to claim 4, wherein the inorganic conductive layer is a layer selected from a group consisting of a titanium carbide vapor deposited film, a carbon vapor deposited film, and a carbon coated layer.

7. The electrolytic capacitor according to claim 1, wherein the conductive substrate comprises: a foil composed of a valve metal, an oxide film composed of an oxide of the valve metal that is placed on a surface of the foil; and an inorganic conductive layer comprising an inorganic conductive material that is placed on a surface of the oxide film, the inorganic conductive layer and the foil are electrically connected to each other, and the conductive polymer layer is placed on a surface of the inorganic conductive layer.

8. The electrolytic capacitor according to claim 7, wherein the foil is an aluminum foil and the oxide film is an aluminum oxide film.

9. The electrolytic capacitor according to claim 8, wherein the inorganic conductive material is at least one material selected from a group consisting of carbon, titanium, titanium nitride, titanium carbide, and nickel.

10. The electrolytic capacitor according to claim 8, wherein the inorganic conductive layer is a layer selected from a group consisting of a titanium carbide vapor deposited film, a carbon vapor deposited film, and a carbon coated layer.

11. The electrolytic capacitor according to claim 1, wherein the ion conductive electrolyte is an ionic liquid or an electrolytic solution in which a solute is dissolved in a solvent.

12. The electrolytic capacitor according to claim 1, wherein the ion conductive electrolyte is an electrolytic solution in which a solute is dissolved in a solvent, and the solute is a carboxylate salt.

13. The electrolytic capacitor according to claim 12, wherein a content of the carboxylate salt is preferably at least 0.1 M in concentration and at most a saturated dissolved amount in the electrolyte solution.

14. The electrolytic capacitor according to claim 1, wherein the ion conductive electrolyte is an electrolytic solution in which a solute is dissolved in a solvent, and the solute is an amidinium salt.

15. The electrolytic capacitor according to claim 1, wherein the ion conductive electrolyte is an electrolytic solution in which a solute is dissolved in a solvent, the solute is composed of a phthalate anion and a 1,2,3,4-tetramethylimidazolinium cation, and the solvent is γ-butyrolactone.

16. The electrolytic capacitor according to claim 15, wherein the solute composed of a phthalate anion and a 1,2,3,4-tetramethylimidazolinium cation is comprised in the electrolyte solution in the range of 0.1 M to 1.3 M in concentration.

17. A method of manufacturing an electrolytic capacitor according to claim 1, comprising:
   a cathode forming step of forming the conductive polymer layer on the surface of the conductive substrate so that the contact resistance between the conductive substrate and the conductive polymer layer is 1 $\Omega cm^2$ or less for obtaining the cathode for the electrolytic capacitor;
   an anode forming step of oxidizing the surface of the substrate composed of a valve metal to form the dielectric layer composed of an oxide of the valve metal for obtaining the anode for the electrolytic capacitor; and
   an electrolyte filling step of making the conductive polymer layer of the cathode and the dielectric layer of the anode face each other through a space and filling the ion conductive electrolyte in the space.

18. The method of manufacturing an electrolytic capacitor according to claim 17, wherein the conductive polymer layer on the surface of the conductive substrate is formed so that the contact resistance between the conductive substrate and the conductive polymer layer is 0.06 $\Omega cm^2$ or less in the cathode forming step.

19. The method of manufacturing an electrolytic capacitor according to claim 17, wherein the conductive substrate used in the cathode forming step comprises: a foil composed of a valve metal, an oxide film composed of an oxide of the valve metal that is placed on a surface of the foil; and an inorganic conductive layer comprising an inorganic conductive material that is placed on a surface of the oxide film,
   the inorganic conductive layer is formed from the inorganic conductive material by a method selected from a group consisting of vacuum deposition, sputtering, ion plating, coating, electrolytic plating, and electroless plating,
   a part of the oxide film is broken in the process of forming the inorganic conductive layer in order to electrically connect the inorganic conductive layer to the foil, and
   the conductive polymer layer is formed on a surface of the conductive layer in the cathode forming step.

20. The method of manufacturing an electrolytic capacitor according to claim 17, wherein the ion conductive electrolyte used in the electrolyte filling step is an ionic liquid or an electrolytic solution in which a solute is dissolved in a solvent.

* * * * *